United States Patent [19]
Chang et al.

[11] Patent Number: 5,835,564
[45] Date of Patent: Nov. 10, 1998

[54] METHOD FOR ENHANCING THE RELIABILITY OF A WIRELESS TELECOMMUNICATIONS SYSTEM

[75] Inventors: Young-fu Chang, Buffalo Grove; Mark Alan McCormick, Naperville, both of Ill.

[73] Assignee: Lucent Technologies Inc., Murray Hill, N.J.

[21] Appl. No.: 688,721

[22] Filed: Jul. 31, 1996

[51] Int. Cl.[6] .............................. H04M 1/24; H04M 3/08
[52] U.S. Cl. .................................. 379/1; 379/34; 379/2; 379/10; 379/26; 455/67.1; 455/423
[58] Field of Search ..................... 455/561, 423, 455/424, 422, 67.1, 404, 674; 379/1, 34, 27, 10, 15, 24, 26; 370/242, 241

[56] References Cited

U.S. PATENT DOCUMENTS

| | | | |
|---|---|---|---|
| 4,180,708 | 12/1979 | Yamaguchi et al. | 455/423 |
| 4,751,725 | 6/1988 | Bonta et al. | 455/423 |
| 5,008,953 | 4/1991 | Dahlin et al. | 455/423 |
| 5,095,500 | 3/1992 | Tayloe et al. | 379/32 |
| 5,274,838 | 12/1993 | Childress et al. | 455/9 |
| 5,355,514 | 10/1994 | Borg | 455/423 |
| 5,357,557 | 10/1994 | Sakakura | 379/27 |
| 5,465,390 | 11/1995 | Cohen | 455/423 |
| 5,481,588 | 1/1996 | Rickli et al. | 455/423 |
| 5,506,837 | 4/1996 | Sollner et al. | 455/426 |
| 5,509,051 | 4/1996 | Barnett et al. | 455/460 |
| 5,541,978 | 7/1996 | Brunner et al. | 379/60 |
| 5,566,225 | 10/1996 | Haas | 379/58 |
| 5,574,774 | 11/1996 | Ahlberg et al. | 455/560 |
| 5,579,535 | 11/1996 | Orlen et al. | 455/426 |
| 5,608,780 | 3/1997 | Gerszberg et al. | 455/436 |
| 5,613,203 | 3/1997 | Dupuy et al. | 455/436 |
| 5,687,217 | 11/1997 | Bliss et al. | 379/59 |
| 5,711,000 | 1/1998 | Ploeg et al. | 455/423 |
| 5,722,073 | 2/1998 | Wallstedt et al. | 455/560 |
| 5,724,665 | 3/1998 | Abbasi et al. | 455/436 |

Primary Examiner—Curtis A. Kuntz
Assistant Examiner—Rexford N. Barnie
Attorney, Agent, or Firm—Mony R. Ghose

[57] ABSTRACT

A method for determining the operational status of base stations deployed in a cellular telecommunications system comprises continually sharing operational status data with adjacent base stations in accordance with a primary diagnostic protocol. Upon non-receipt of an operational status message, a supplemental diagnostic protocol is executed to identify a malfunctioning base station. The failed status of an identified malfunctioning base station is extended to a mobile switching center over an established data interface. In some circumstances, the mobile switching center extends radio allocation information to a functional base station so that the functional base station may perform temporary administrative services for the adjacent failed base station until permanent repairs can be made.

13 Claims, 6 Drawing Sheets

METHOD FOR ENHANCING THE RELIABILITY OF A WIRELESS TELECOMMUNICATIONS SYSTEM

TECHNICAL FIELD

This invention relates to base stations, and more particularly, to providing seamless telecommunications services to mobile subscribers served by cellular base stations in a wireless telecommunications system.

BACKGROUND OF THE INVENTION

The world-wide proliferation of wireless telecommunications is the consequence of substantial cost breakthroughs in wireless telecommunications terminals, more commonly known as "mobile telephone stations". The "cellular" principle has also contributed to the growth of wireless telecommunications by enabling voice, and data, to be carried over an allocated radio spectrum to cell sites across wide geographic areas. As a result, it is commonplace for modem subscribers of telecommunications services to own separate wireless, and wireline, telecommunications terminals which are served by distinct wireless and wireline systems.

Although the average subscriber's expectation of wireless network reliability is exceeded by the expectation of wireline network reliability, wireless telecommunications service providers endeavor to offer highly dependable, seamless service. One obstacle to providing this type of service is the unpredictable, random malfunctioning of base stations. Presently, a non-functional base station is detected by the wireless telecommunications service provider only when field testing by technical personnel identifies a malfunction, or when a subscriber complains. Identification of a non-functional base station results in notification of technical personnel so that appropriate repairs can be made.

A substantial period of time often passes from detection of the malfunctioning base station to completion of appropriate repairs. During this period, mobile subscribers located in the geographic area affected by the non-functional base station are unable to make, or receive, telephone calls. As telecommunications service providers are well aware, disruption of service is the primary cause for subscriber dissatisfaction and frustration. Therefore, there is a need in the art for efficiently identifying malfunctioning base stations, and restoring service to mobile subscribers affected by malfunctioning base stations in a wireless telecommunications system.

SUMMARY OF THE INVENTION

The above problem is solved, and a technical advance is achieved in the art, by proactively determining the operational status of base stations in a wireless telecommunications system, and using functional base stations to provide temporary administrative services to malfunctioning base stations until permanent repairs can be made.

In accordance with the preferred embodiment of the present invention, cellular base stations in a wireless telecommunications system perform a primary diagnostic protocol to dynamically relay operational status information. To facilitate the diagnostic process, cell sites in a cellular telecommunications system are grouped in clusters. The primary diagnostic protocol allows each station to send, and receive, operational status messages from surrounding base stations. Geometrical characteristics of the clusters are exploited to pass operational status information to surrounding cell sites, and minimize the number of operational status messages relayed. Upon failure to receive a response, or receipt of a malfunctioning status response, the primary diagnostic protocol is augmented with a supplementary diagnostic protocol. In some cases, an operational base station may provide temporary cell site administrative services for the malfunctioning base station until permanent repairs are made.

DETAILED DESCRIPTION

In the preferred embodiment of the present invention, a plurality of cell sites in a telecommunications system are arranged in a cell site cluster. Preferably, all cell sites in the cluster are served by a single mobile switching center. Consistent with convention, cell sites are represented as hexagonal structures. An optimum number of cell sites per cluster is nine but alternative embodiments may have a fewer, or greater, number of cell sites per cluster.

Figure 1:
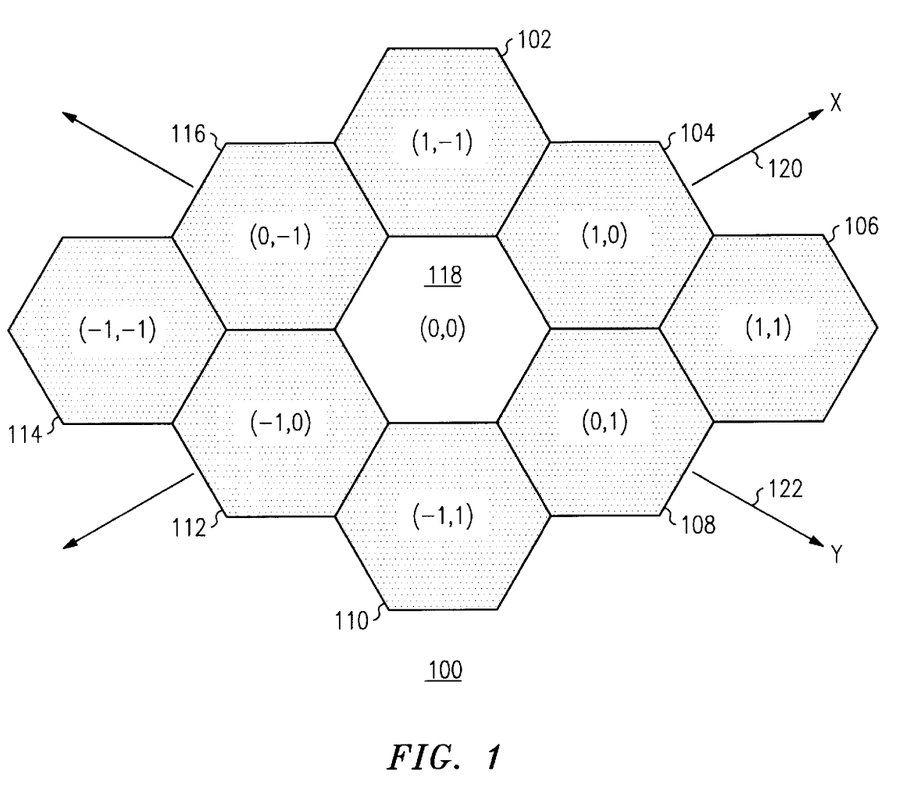
FIG. 1 is a graphical representation of a cell site cluster.

FIG. 1 is a graphical representation of a preferred embodiment of a cell site cluster. More particularly, cell site cluster 100 includes individual cell sites 102, 104, 106, 108, 110, 112, 114, 116 and 118. In an operational cellular telecommunications system, cluster 100 is surrounded by other cell sites.

Each cell site has unique set of coordinates with respect to X axis 120, and Y axis 122 which intersect at the center of cell site 118. More particularly, cell site 102 is identified by coordinates (1,−1), cell site 104 is identified by coordinates (1,0), cell site 106 is identified by coordinates (1,1), cell site 108 is identified by coordinates (0,1), cell site 110 is identified by coordinates (−1,1), cell site 112 is identified by coordinates (−1,0), cell site 114 is identified by coordinates (−1,−1), cell site 116 is identified by coordinates (0,−1), and cell site 118 is identified by coordinates (0,0). Cell sites 102, 104 ... 118 include base stations (not shown) which transmit radio messages between mobile subscriber terminals, and the mobile switching center for interconnection to the rest of the public-switched telephone network.

Figure 2:
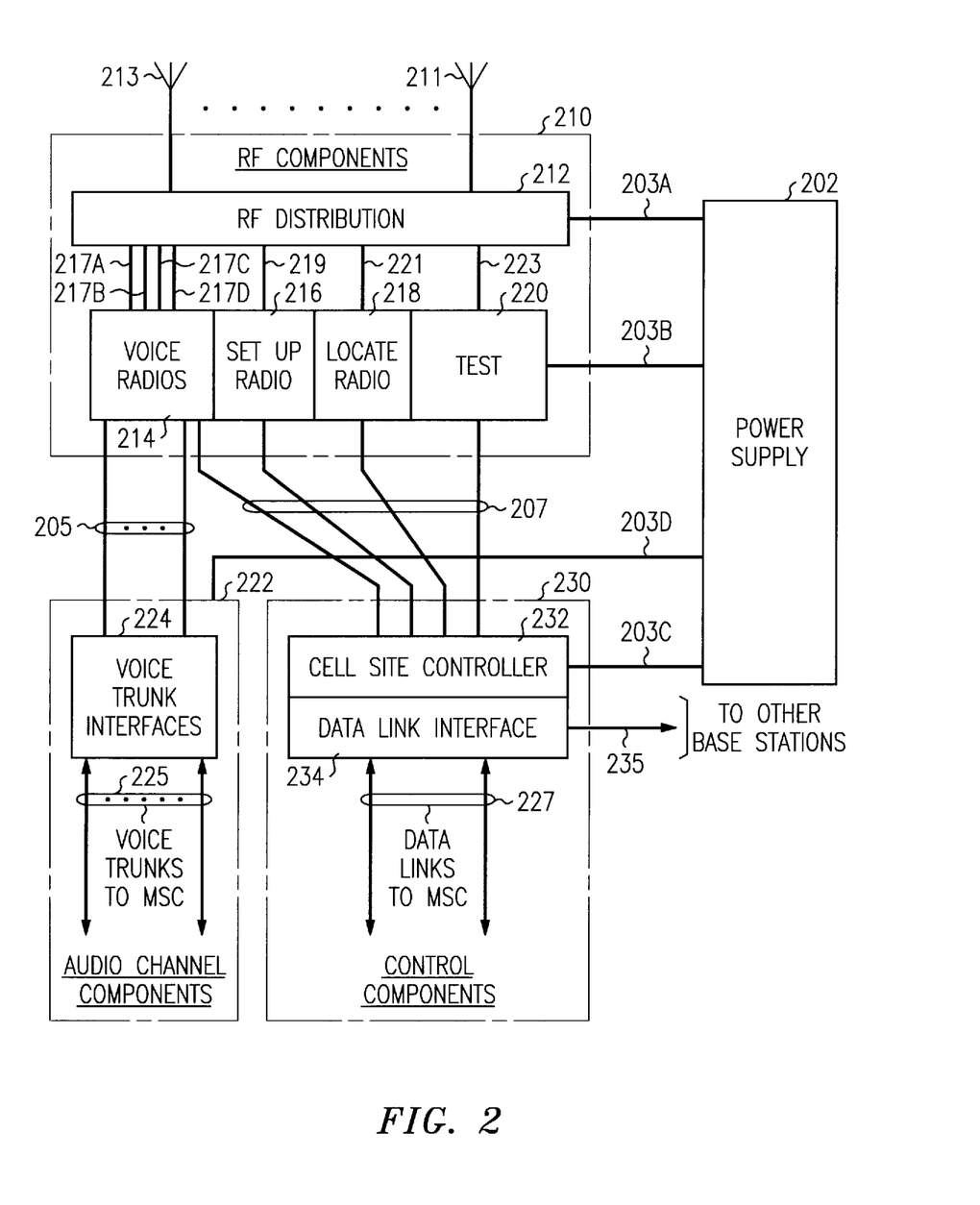
FIG. 2 is a block diagram of a base station in which the present invention may be practiced.

FIG. 2 is a simplified block diagram of an exemplary base station found in each cell site. In this example, base station 200 includes: power supply 202; radio frequency (RF) sub-system 210; audio channel sub-system 222; and control sub-system 230. Power supply 202 provides power to RF sub-system 210 via link 203A and 203B. Control sub-system 230 receives power from power supply 202 via link 203C, and audio channel sub-system 222 receives power over link 203D.

RF sub-system 210 include first antenna 211, second antenna 213, and RF distribution module 212. RF distribution module 212 is interconnected to a plurality of administrative modules via data links. More particularly, voice radio administrative module 214 is interconnected to the RF distribution module via data links 217 A–D, set up radio module 216 is interconnected to the distribution module by data link 219, locate radio module 218 is interconnected to the distribution module via data link 221, and test module 220 is interconnected to RF distribution module 212 via link 223. Set up radio module 216 receives call set up requests from mobile subscribers located in the cell site served by base station 200. Locate radio module 218 locates mobile subscribers for incoming call. In the preferred embodiment, self, primary and supplemental diagnostic protocols and base station-related data are stored in test module 220. Alternative embodiments may employ many more data links interconnecting RF distribution module 212 to the administrative modules.

Audio channel sub-system 222 comprises voice trunk interfaces 224 interconnected to the mobile switching center via a plurality of voice trunks 225. During a call, a voice trunk interface extends voice transmissions from the mobile switching center to a specified voice radio channel in voice radio module 214 over links 205. The voice transmissions are subsequently delivered to mobile subscribers via radio antennas 211, 213, as is known in the art.

Control sub-system 230 comprises cell site controller 232, data link interface 234 and a plurality of data links 227 to the mobile switching center. Cell site controller 232 manages all functions associated with base station 200. Particularly, the cell site controller receives call requests from mobile subscribers located within the cell site via set up module 216, and establishes conversations via voice radio module 214. Cell site controller 232 also locates mobile subscribers for incoming calls via locate radio module 218, and administers system protocols. Cell site controller 232 communicates with the mobile switching center via data link interface 234, and with other base stations via inter-base station link 235, as known in the art. Bi-directional data links 207 interconnect sub-system 230 to the modules. In accordance with the preferred embodiment, cell site controller 232 is capable of providing call set-up, locate, and test functions for other base stations, via inter-base station link 235, when directed by the mobile switching center.

Figure 3:
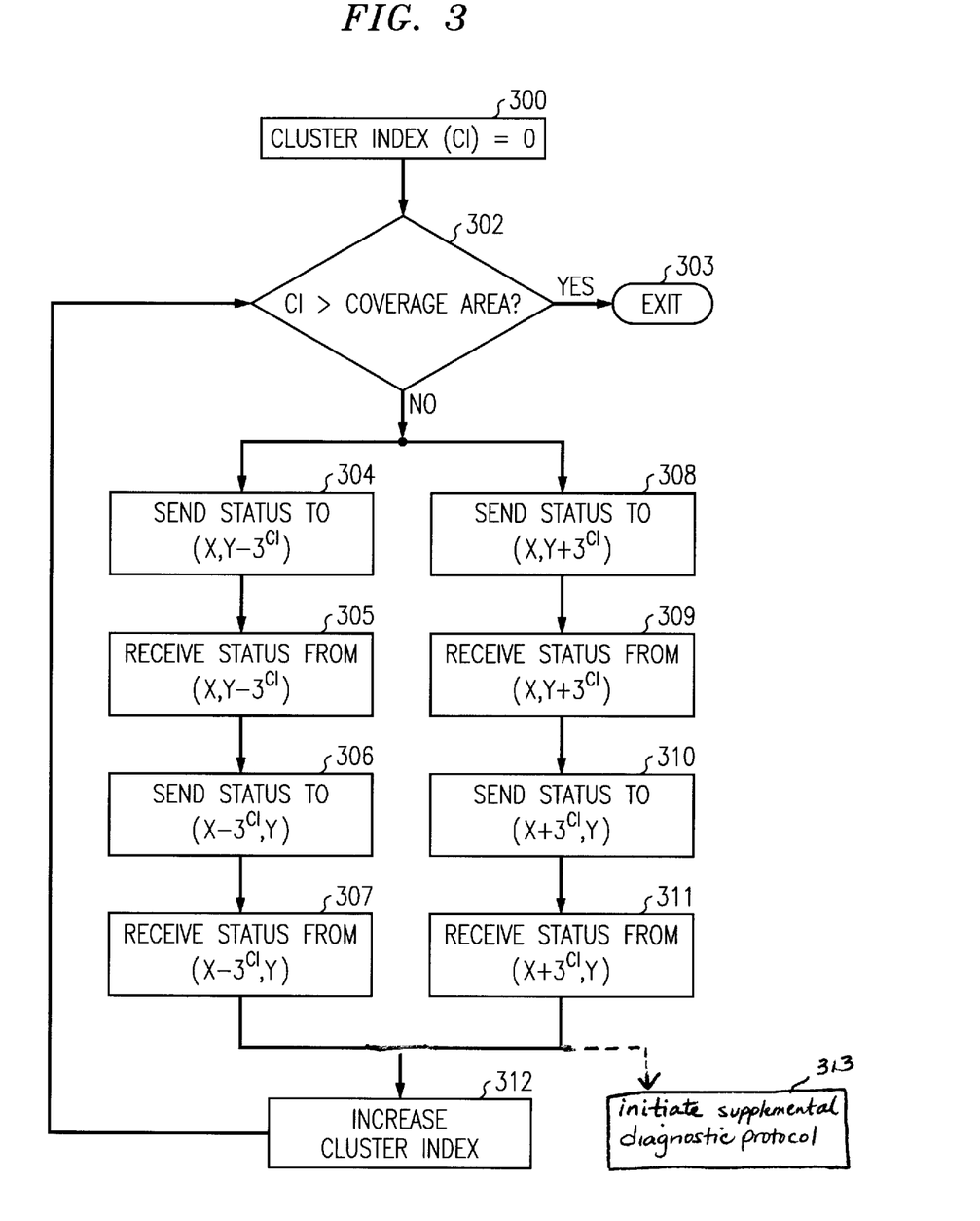
FIG. 3 is a flow diagram illustrating the steps performed during a primary diagnostic process.

FIG. 3 is a flow diagram describing the steps performed by a base station in a cellular telecommunications system during the primary diagnostic protocol. In the preferred embodiment, the primary diagnostic protocol occurs continuously, unless implementation of the supplemental diagnostic protocol is warranted. For purposes of example, assume that the primary diagnostic protocol described below is executed by base station 200 in cell site 118. Base station 200 is identified by coordinates x=0, y=0 (see FIG. 1). Base station 200 is hereinafter referred to as the "data gathering" base station to distinguish it from other base stations in the cell site cluster. Although the diagnostic procedures are described with reference to base station 200, all base stations in the preferred embodiment of a cellular system perform diagnostic protocols, and store operation status data.

The process begins in step 300 in which cell site controller 232 determines the cluster index (CL) for this particular iteration of the primary diagnostic protocol. The cluster index defines the geographic parameters of the diagnostic process. For example, a cluster index of "0" indicates that the geographic parameter is defined by the eight (8) cell sites immediately adjacent to the data gathering base station. In other words, CL=0 for cell site 118 implies a geographic parameter defined by cell sites 102, 104, 106, 108, 110, 112, 114 and 116. A CL=1 for cell site 118 indicates that the geographic parameter is defined by the surrounding seventy-two (72) cell sites (that is, all adjacent cell site clusters which include each one of the eight above-mentioned cell sites in cluster 100). In this example, assume the cluster index is "0".

The process continues to decision step 302 in which the cell site controller determines whether the CL is greater than its initialized coverage area. Prior to operation, each cell site controller is initialized with a maximum CL value so that diagnostic protocols are performed for only those cell sites for which the data gathering base station can ultimately perform administrative services. If the outcome of determination step 302 is a "YES" determination, the process ends in step 303. If, as in this case, the outcome of decision step 302 is a "NO" determination, the process continues to steps 304, and 308 which occur simultaneously.

In step 304, base station 200 (identified by coordinates x=0, y=0) sends its operational status to the cell site base station associated with coordinates x, y$-3^{C1}$ (that is, coordinates (0,−1) identifying cell site 116). In the preferred embodiment, each base station is equipped with a module, such as test module 220, for performing a self-diagnostic test, and for issuing its operational status upon receipt of operational status from another base station. The self diagnostic test evaluates the operational status of each base station component, including antennas, voice radio module, set-up radio module, and locate radio module. The process continues to step 305 in which base station 200 receives, and stores, the operational status from the base station to which its status was sent. In this case, base station 200 receives the operational status from the base station of cell site 116. In step 306, base station 200 sends its operational status to the cell site base station associated with coordinates x$-3^{C1}$, y. In this case, coordinates (−1,0) identify cell site 112. In step 307, base station 200 receives the operational status from the base station of cell site 112. In the preferred embodiment, the operational status from cell site 112 also includes the operational status of cell sites 110, 112 and 114. In other words, there was a previous exchange of operational data among base stations in cell sites 110, 112, and 114. The geometric characteristics of cell site cluster 100, however, allows base station 200 to retrieve information about the equipment in cell sites 110 and 114 by retrieving the operational status data stored in the base station of cell site 112. If even one of the base stations in cell sites 110, 112 or 114 is malfunctioning, cell site 112 will not send an operational status message, or will send a failure message as the operational status. Lack of a response, or receipt of a failure message in the data gathering base station, initiates the supplemental diagnostic protocol described in FIGS. 4A and 4B.

In a process occurring simultaneously with process steps 304–307, base station 200 sends its operational status to the cell site corresponding to coordinates x, y$+3^{C1}$ (that is, coordinates (0,1) which identify cell site 108) in step 308. The process continues to step 309 in which base station 200 receives an operational message from cell site 108. In step 310, base station 200 sends its operational status to the cell site corresponding to coordinates x$+3^{C1}$, y (that is, coordinates (1,0) or cell site 104). In accordance with the preferred embodiment, the base station in cell site 104 has exchanged operational status data with the base stations in cell sites 102 and 106. Therefore, operational status data associated with cell sites 102, 104 and 106 is stored in the base station of cell site 104. In step 311, base station 200 receives, and stores, the operational status from cell sites 102, 104 and 106 in the response from cell site 104. The operational status messages may be relayed via base station antennas, such as radio antennas 211 and 213, or via inter-base station links, such as link 235. Subsequent to steps 307 and 311, the cluster index is increased at step 312, and the process returns to decision step 302. Alternatively, if an adjacent base station was non-responsive, or if a failure message was received, the data gathering station initiates the supplemental diagnostic protocol in step 313.

Figure 4A:
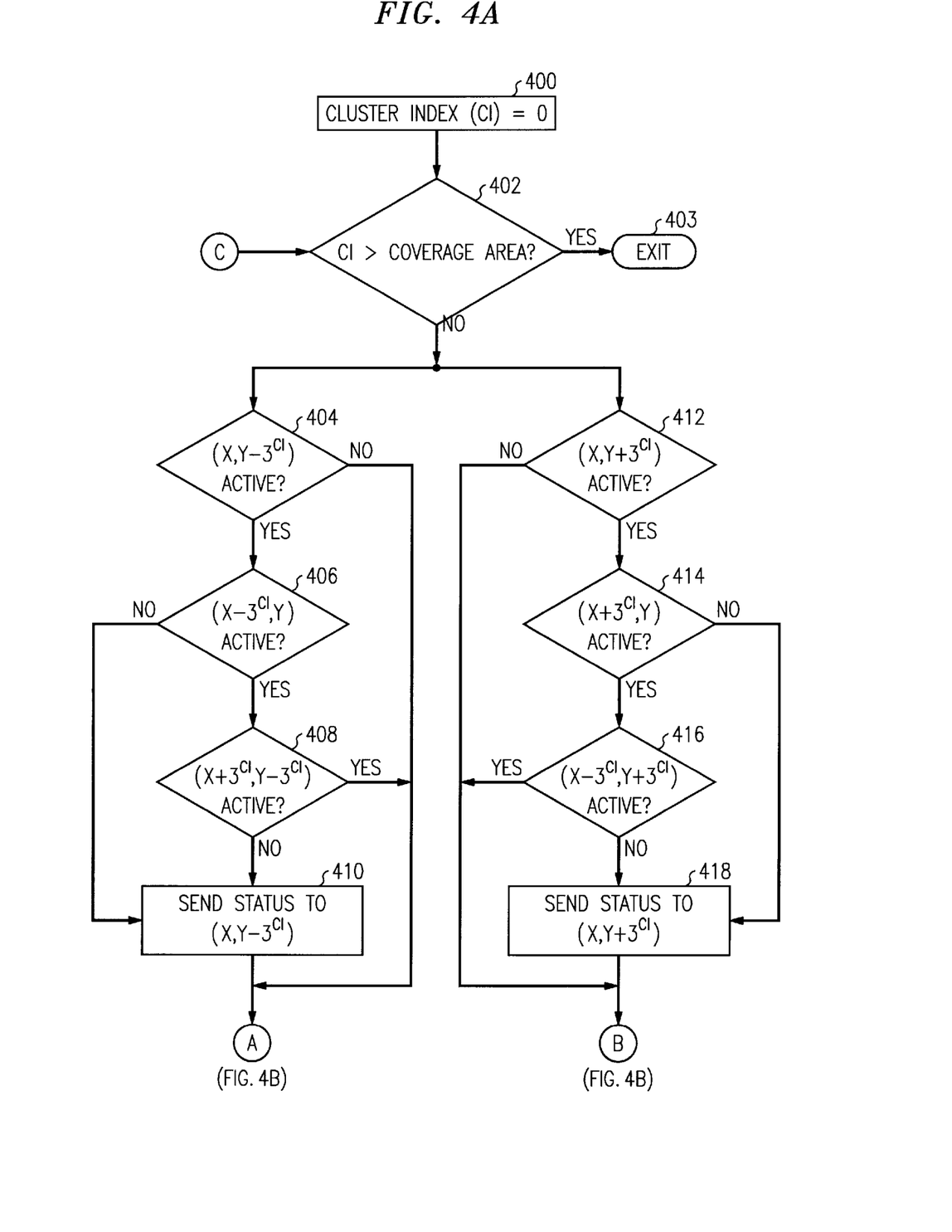
FIGS. 4A and 4B are flow diagrams illustrating the steps performed during a supplemental diagnostic process.
Figure 4B:
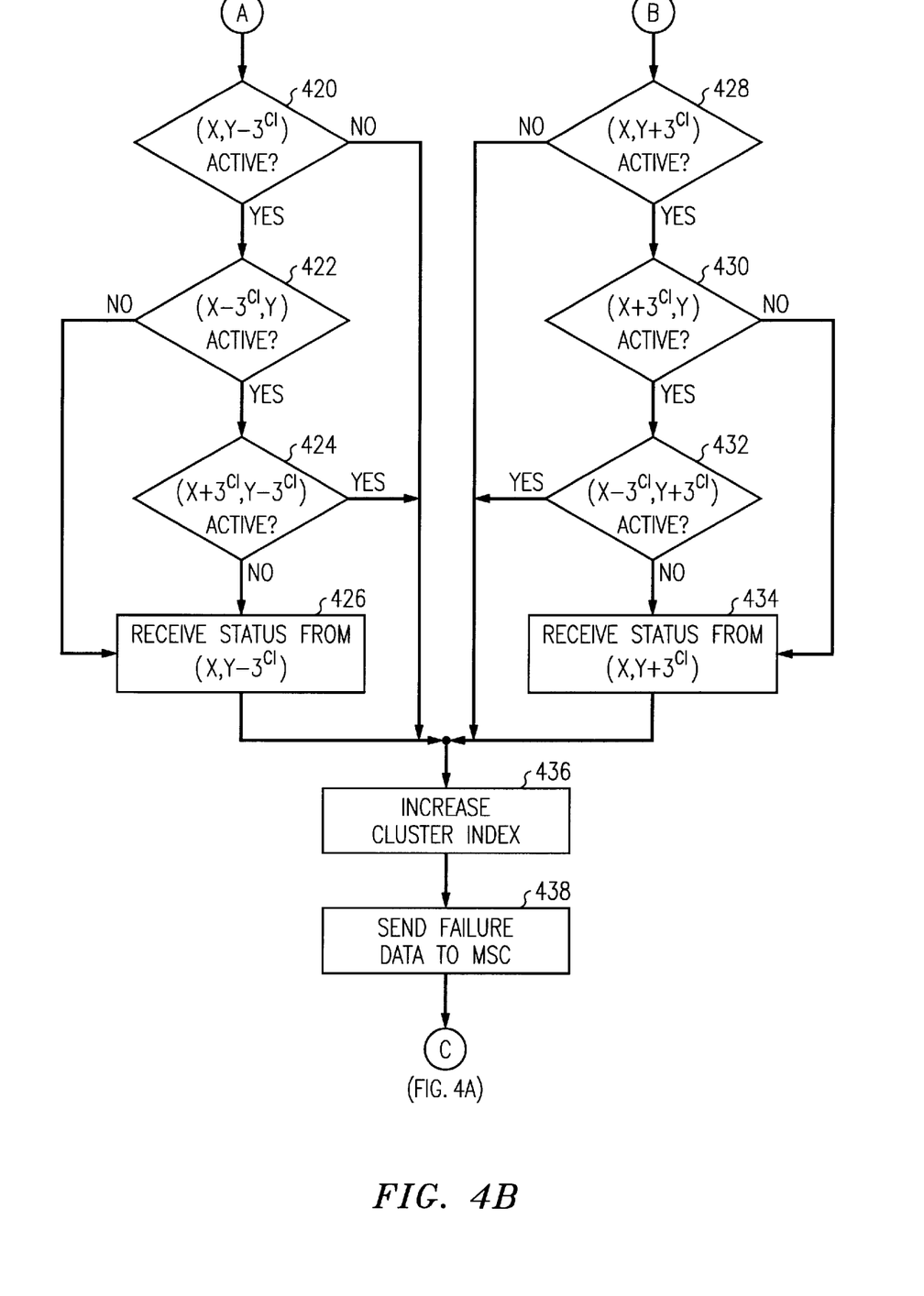

The process described above is used to dynamically detect base station functionality. FIGS. 4A and 4B describe the steps performed when data gathering base station 200 does not receive an operational status message, or receives a base station failure message from cell sites 104, 108, 112 or 116. In other words, FIGS. 4A and 4B describe the supplemental diagnostic protocol.

The supplemental diagnostic process begins in step 400 in which the data gathering base station determines the cluster index of this particular iteration of the supplemental diagnostic protocol. For purposes of example, assume that the cluster index for this iteration of the supplemental diagnostic is "0". Therefore, the geographic parameter is still defined by the eight (8) cell sites surrounding base station 200. The process continues to decision step 402 in which base station 200 determines whether the cluster index is greater than its coverage area. If the outcome of decision step 402 is a "YES" determination, the process ends in step 403. If the outcome of decision step 402 is a "NO" determination, the process continues, simultaneously, to a series of decision steps in which operational status messages received from adjacent base stations during the primary diagnostic protocol are evaluated by the data gathering base station to determine which adjacent base stations are experiencing failure. The supplemental diagnostic process is required because base station 200 does not query each base station in the cell site cluster for operational status data. Particularly, in decision step 404, base station 200 determines whether the operation status reply received from the cell site associated with the coordinates x, y–$3^{C1}$ (that is, coordinates (0,–1) corresponding to cell site 116) indicates that the cell site is active. If the outcome of decision step 404 is a "NO" determination, the process continues through connector "A" to FIG. 4B described below. If the outcome of decision step 404 is a "YES" determination, the process continues to decision step 406 in which base station 200 determines whether the operational status message received from the cell site associated with the coordinates x–3, $y^{C1}$ (that is, coordinates (–1, 0) corresponding to cell site 112) indicates that cell site 112 is active. If the outcome of decision step 406 is a "NO" determination, the process continues to step 410 in which the data gathering base station 200 extends the operational status of all base stations (as collected during the primary diagnostic protocol) to base station 116 identified by coordinates x, y–$3^{C1}$ In this manner, base stations in cell site cluster 100 are informed of adjacent base station failure. If the outcome of decision step 406 is a "YES" determination, the process continues to step 408 in which base station 200 determines whether the operational status reply received from the cell site associated with coordinates x+$3^{C1}$, y–$3^{C1}$ (that is, cell site 102) indicates that the base station is active. If the outcome of decision step 408 is a "NO" determination, the process continues to step 410 in which base station 200 extends the operational status all base stations, as collected during the primary diagnostic protocol to the cell site associated with coordinates x, y–$3^{C1}$ (cell site 116). If the outcome of decision step 408 is a "YES" determination, the process continues through connector A to FIG. 4B described below.

In step 412, occurring simultaneously with the process described above, base station 200 determines whether the operational status message received from the cell site identified by coordinates x, y+$3^{C1}$ (that is, cell site 108) indicates that the base station in cell site 108 is active. If the outcome of decision step 412 is a "NO" determination, the process continues through connector "B" to FIG. 4B. If the outcome of decision 412 is a "YES" determination, the process continues to step 414 in which base station 200 determines whether the cell site associated with coordinates x+$3^{C1}$, y (that is, cell site 104) is active. If the outcome of decision step 414 is a "NO" determination, the process continues to step 418 in which base station 200 sends operational status messages collected during the primary diagnostic protocol to the cell site associated with coordinates x, y+$3^{C1}$, (cell site 108). If the outcome of decision step 414 is a "YES" determination, the process continues to step 416 in which base station 200 determines whether the operational status received from the cell site corresponding to coordinates x–$3^{C1}$, y+$3^{C1}$ (that is, cell site 110) indicates that the base station of cell site 110 is active. If the outcome of decision step 416 is a "NO" determination, the process continues to step 418 in which base station 200 sends the status messages collected during the primary diagnostic protocol to the cell site identified by coordinates x, y+$3^{C1}$ (cell site 108). If the outcome of decision step 416 is a "YES" determination, the process continues through connector B to FIG. 4B.

In FIG. 4B, decision steps 420 and 428 occur simultaneously. Particularly, in decision step 420, data gathering base station 200 once again determines whether the operational status message received from the cell site identified by coordinates x, y–$3^{C1}$ (cell site 116) indicates that the cell site is active. If the outcome of decision step 420 is a "NO" determination, the process continues to step 436 described below. If the outcome of decision step 420 is a "YES" determination, the process continues to step 422 in which the base station 200 determines whether the base station serving the cell site x–$3^{C1}$, y (that is, cell site 112) is active. If the outcome of decision step 422 is a "NO" determination, the process continues to step 426 described above. If the outcome of decision step 422 is a "YES" determination, the process continues to step 424 in which the polling base station determines whether the base station in cell site x+$3^{C1}$, y–$3^{C1}$ (that is, cell site 102) is active. If the outcome of decision step 422 is a "NO" determination, the process continues to step 426 in which operational status is received from the cell site corresponding to coordinates x, y–$3^{C1}$ (cell site 116). If the outcome of decision step 424 is a "YES" determination, the process continues to step 436.

In FIG. 4B step 428, base station 200 once again determines whether the base station associated with coordinates x, y+$3^{C1}$ (cell site 108) is active. If the outcome of decision step 428 is a "NO" determination, the process continues to step 436. If the outcome of decision step 428 is a "YES" determination, the process continues to step 430 in which the data gathering base station determines whether the base station associated with the coordinates x+$3^{C1}$, y (cell site 104) is active. If the outcome of decision step 430 is a "NO" determination, the process continues to step 434 in which base station 200 receives the operational status from, cell site 108 associated with coordinates x, y+$3^{C1}$. If the outcome of decision step 430 is a "YES" determination, the process continues to step 432 in which base station 200 determines whether the base station identified by coordinates x–$3^{C1}$, y+$3^{C1}$ (cell site 110) is operational. If the outcome of decision step 432 is a "NO" determination, the process continues to step 434 in which base station 200 receives a status message from the cell site identified by coordinates x, y+$3^{C1}$ (cell site 108). If the outcome of decision step 432 is a "YES" determination, the process continues to step 436 in which base station 200 increases the cluster index to reach cell sites in a greater geographic area. In step 438, the data gathering base station 200 extends data identifying all non-active (failed) base stations to the mobile switching center via data interface 234. Subsequent to step 438, the process returns to FIG. 4A step 402 via connector "C" until all base stations are active, and technical personnel have reset all base stations to perform the primary diagnostic protocol.

Figure 5:
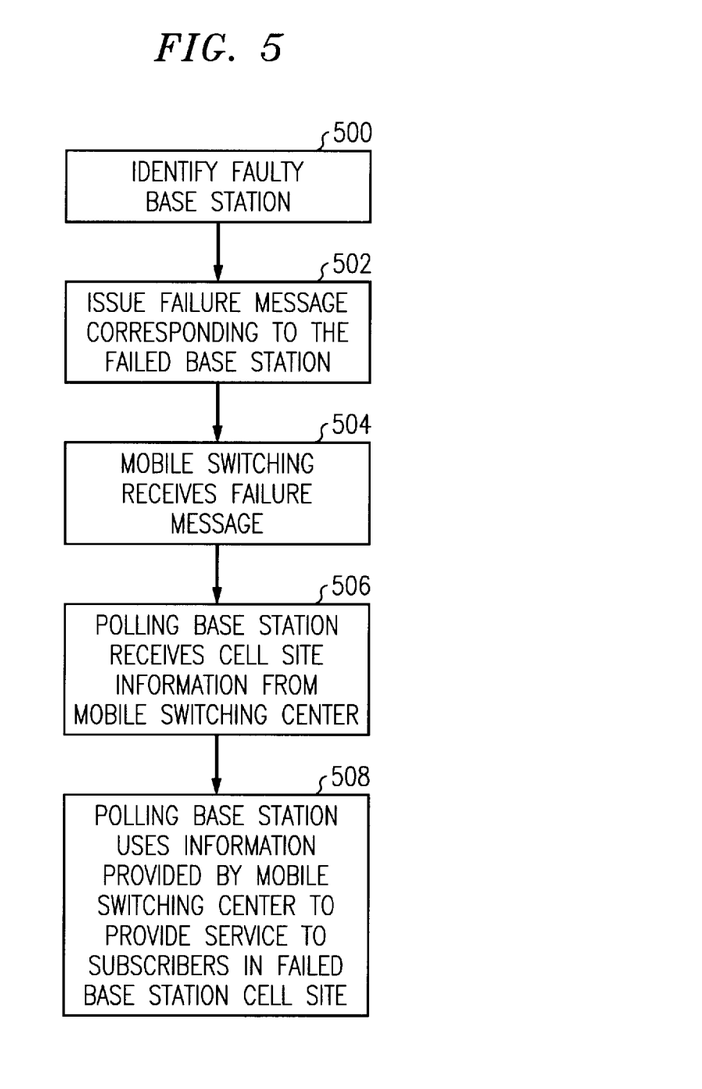
FIG. 5 is a flow diagram illustrating the steps performed to provide temporary administrative services to malfunctioning base stations.

FIG. 5 describes, in greater detail, the steps performed by base station 200 in response to identifying non-functional base stations during the supplemental diagnostic protocol. More particularly, in step 500, base station 200 identifies the cell sites identified as having non-active (or failed) base stations. In step 502, base station 200 extends a failure message to its serving mobile switching center via a data link. The failure message includes the coordinates of all failed cell sites, the time of the failure determination for each cell site, and date of the failure determination for each cell site.

In step 504, base station 200 receives a failure acknowledgment message from the mobile switching center. The process continues to step 506 in which base station 200 receives information for administering telecommunications services to mobile subscribers located in selected non-functional cell site. More particularly, the serving mobile switching center extends set-up channel, and locate channel information associated with at least one failed cell site to cell site controller 232 of base station 200. Other base stations in cell site cluster 100 may receive call set-up and locate data associated with the same or other failed cell sites. In step 508, base station 200 uses the information received from the mobile switching center to set up calls for mobile subscribers located in the failed cell sites via inter-base station links. In the preferred embodiment, a plurality of functional cell sites may serve mobile subscribers affected by the malfunctioning of a single base station.

Advantageously, cell sites are arranged in clusters which allow any given base station to gather operational status information of surrounding cell sites without querying each base station in those cell sites. A supplemental diagnostic protocol is initiated when identification of a particular, failed base station is required. Subsequent to verification of base station failure, functional base stations may be directed by the mobile switching center to perform administrative tasks for a failed base station until permanent repairs are made.

While this invention is described with reference to a preferred embodiment, it is understood that those skilled in the art may devise numerous other arrangements without departing from the scope of the invention.

We claim:

1. In a wireless telecommunications system including a plurality of sites, each site having at least one base station for providing wireless telecommunication service to mobile subscribers, a method for determining operational status of the base station comprises the steps of:

grouping cell sites in a cell site cluster to determine operational status of a base station disposed in each cell site;

initializing each base station in each cell site with a primary diagnostic protocol, and a supplemental diagnostic protocol;

base stations in the cell cluster exchanging operational status data with each other in accordance with the primary diagnostic protocol;

determining that the supplemental diagnostic protocol should be implemented; and executing the supplemental diagnostic protocol.

2. The method of claim 1, and further comprising the step of:

receiving an operational status message from a base station wherein the operational status message includes the operational status of a plurality of other base stations.

3. The method of claim 1 wherein the step of determining that the supplemental diagnostic protocol should be implemented comprises the step of:

failing to receive an operational status reply from at least one base station.

4. The method of claim 1 wherein relaying operational status data comprises the step of:

extending an operational status message to another base station over an inter-base station link.

5. The method of claim 1 wherein relaying operational status data comprises the step of:

extending an operational status message to another base station via a base station antenna.

6. In a cellular telecommunications system comprising a plurality of cell sites, each cell site including at least one base station, a method for providing telecommunications services to mobile subscribers comprises the steps of:

grouping cell sites in a cell site cluster to determine operational status of base stations disposed in the cell sites;

initializing each base station in each cell site with a diagnostic protocol wherein the diagnostic protocol allows base stations to exchange operational status information;

using the diagnostic protocol to identify malfunctioning base stations;

extending malfunctioning base station data determined by the diagnostic protocol to a mobile switching center;

receiving administrative data from the mobile switching center in response to extending the malfunctioning base station data; and administering call set up functions for at least one failed base station using the administrative data received from the mobile switching center.

7. The method of claim 6 wherein initializing each base station with a diagnostic protocol comprises the steps of:

initializing each base station with a primary diagnostic protocol; and initializing each base station with a supplemental diagnostic protocol.

8. The method of claim 6 wherein using at least one diagnostic protocol to identify a malfunctioning base station comprises the step of:

failing to receive an operational status reply message from an adjacent base station.

9. The method of claim 6 wherein receiving administrative data from the mobile switching center in response to extending the malfunctioning base station information comprises the step of:

receiving set up radio channel and locate radio channel information relating to the malfunctioning base station from the mobile switching center.

10. A base station disposed in a cellular telecommunications system comprises:

an interface means for interconnecting the base station to other base stations;

a primary diagnostic protocol for enabling exchange of operational status data among base stations;

a supplemental diagnostic protocol for identifying failed base stations; and controller means for implementing the primary diagnostic protocol and the supplemental diagnostic protocol.

11. The base station of claim 10, and further comprising:

interface means for interconnecting each base station to a mobile switching center.

12. The base station of claim 10, and further comprising:

storage means for storing base station operational status data.

13. The base station of claim 10 wherein the controller means performs administrative functions for another base station as directed by the mobile switching center.

* * * * *